United States Patent [19] [11] Patent Number: 4,518,118
Takata [45] Date of Patent: May 21, 1985

[54] MODULAR LOW PRESSURE STRIP SPRAYING APPARATUS AND SYSTEM

[75] Inventor: Harry H. Takata, Minneapolis, Minn.

[73] Assignee: Ag-Chem Equipment Co., Inc., Minneapolis, Minn.

[21] Appl. No.: 431,388

[22] Filed: Sep. 30, 1982

[51] Int. Cl.³ .................. B05B 1/14; B05B 9/20; A01G 25/09
[52] U.S. Cl. .................. 239/163; 239/172; 239/565
[58] Field of Search ............ 239/565, 163, 170, 164, 239/159, 1 TZ

[56] References Cited

U.S. PATENT DOCUMENTS

| 1,960,472 | 5/1934 | Balaam | 239/550 X |
| 2,086,055 | 8/1935 | Taylor | 239/565 |
| 3,199,423 | 8/1965 | Dickey | 94/44 |
| 3,550,854 | 12/1970 | Fischer | 239/155 |
| 3,670,962 | 6/1972 | Johnston | 239/62 |
| 3,815,830 | 6/1974 | Rowan | 239/163 |
| 3,877,645 | 4/1975 | Oligschlaeger | 239/155 |
| 3,976,313 | 8/1976 | Lauffenburger et al. | 285/312 X |
| 4,052,003 | 10/1977 | Steffen | 239/71 |
| 4,220,998 | 9/1980 | Kays | 364/510 |
| 4,260,107 | 4/1981 | Jackson | 239/74 |

Primary Examiner—Andres Kashnikow
Assistant Examiner—Kevin Patrick Weldon
Attorney, Agent, or Firm—Orrin M. Haugen; Thomas J. Nikolai; Douglas L. Tschida

[57] ABSTRACT

A strip nozzle assembly containing a detachable, pressure regulating inlet coupler and a plurality of pressure regulating outlet nozzles, whereby agricultural sprays may be strip applied. The assembly having particular application in a modular spraying system adaptable to either broadcast or strip spraying. Compatibility with system pressure and desired flow rates are achieved via flat plate, sharped edge orifices that in one embodiment are arranged in a series/parallel configuration.

2 Claims, 5 Drawing Figures

MODULAR LOW PRESSURE STRIP SPRAYING APPARATUS AND SYSTEM

BACKGROUND OF THE INVENTION

The present invention relates to agricultural spraying systems, and, in particular, to a modular broadcast/strip application system whereby strip application is achieved with a relatively high back-pressure conversion assembly.

Prior to the present invention, various research and field trials have demonstrated that row crop yields can be increased by applying various liquid fertilizers which may include various proportions of nitrogen, phosphorous and potassium in concentrated bands or strips relative to the row crops rather than by applying the same amount of material in a broadcast fashion over the entire area between row crops. While strip application may be performed prior to, during, or subsequent to planting and with various desired spacings relative to the row crops, it generally serves to make the applied treatment materials more rapidly available to the growing row crops. The availability of nutrients and increased yields, in turn, have however become more important as the costs for such treatment materials have risen. For more information with respect to such application techniques, attention is directed to Chapter 20 of the Liquid Fertilizer Manual of the National Fertilizer Solutions Association and to various product literature from the various suppliers of chemicals for row crops (e.g. a publication entitled Improving Per Pound Efficiency by Positive Placement published by Allied Chemical Company).

While surface band and strip application techniques have been known for some time, application systems are more typically designed for broadcast spraying and which is the more forgiving of operator and equipment error. Single purpose systems have been designed though for strip application. In either case, the resulting special purpose systems require an operator to maintain separate pieces of equipment which is not economical.

The present invention, therefore, is directed to a multi-purpose spray system and in particular to a broadcast spray system that is easily converted to a strip spray system via the coupling of individual strip spray nozzle assemblies to desired ones of the outlet parts of the broadcast system. In this regard, the spray nozzles of a broadcast spray system are typically spaced apart from one another on the order of 60 inches. For strip application, however, it is desirable to space the nozzles on the order of 15, 20 or 30 inches apart. Assuming therefore that it is desired to apply the same amount of material with more nozzles, the flow rate per nozzle must be reduced on the order of one-fourth, one-third or one-half for the above outlet port spacing. While this end can be achieved by reducing the aperture size of the orifice for each nozzle, such a reduction introduces problems that are not advantageous to a convertible system.

In particular, attendant with any decrease in the aperture size of the orifices for strip application are concerns with respect to pressure and particulate size, since often times the liquids that are sprayed are comprised of mixtures that contain suspended solids. Therefore too small an aperture can result in blockage, should various of the suspended particles become lodged at the orifice opening. The present invention, therefore seeks to minimize clogging sensitivity by using relatively large orifices having apertures on the order of 0.20 inches in diameter for strip application. Such orifices however introduce concerns with respect to pressure.

Pressure is a concern in that the pressure requirements of a broadcast system require less regulation than for a strip system. Specifically, due to the fewer number of nozzles for a broadcast system, a single control can typically maintain equivalent pressures at each outlet port and nozzle and thereby achieve a uniform flow rate at each nozzle. However, by converting a broadcast system to a strip system by increasing the number of nozzles and at the same time increasing the aperture size and reducing the pressure at each nozzle, variations in pressure from nozzle to nozzle can result and produce disparities in flow rates, which otherwise are not encountered at the higher pressures and fewer nozzles of a broadcast system. Therefore it is a primary object of the present invention to enable the conversion of a broadcast system to a strip application system having substantially uniform pressures at each strip nozzle and wherein the system will accommodate various types of liquid suspension as well as totally dissolved solutions.

It is a further object of the present invention to enable a modular system capable of high speed application with output metering orifices that also shape the flow streams at each nozzle into narrow-high velocity solid streams.

It is another object of the present invention to minimize or eliminate the sensitivity to viscosity variations in mixed fertilizers and maintain a predictable flow rate.

It is a still further object of the present invention to enable a convertible system wherein the flow rate at each outlet nozzle is regulated by a plurality of pressure adjusting series/parallel orifices.

These objects and still others will, however, become more apparent upon a reading of the following description with respect to the following drawings.

SUMMARY OF THE INVENTION

A pressure regulating strip nozzle assembly detachably mountable to a broadcast liquid spray system for ensuring uniform strip application of liquid treatment materials via each outlet nozzle of the assembly. The assembly essentially comprises a secondary metering nozzle detachably mountable to a primary distribution manifold, a secondary distribution manifold coupled to the secondary metering nozzle and a plurality of secondary nozzles coupled thereto for applying liquids or liquid suspensions in relatively solid streams.

In one embodiment, each of the nozzles of the assembly utilize sharp edged orifices that are relatively insensitive to viscosity changes so that flow rate is primarily determined by pressure alone. They are, in turn, sized to be relatively clog-free when used with liquid fertilizers containing suspended solids. A desired back-pressure at each outlet nozzle is further achieved via a series/parallel assembly configuration, although various other desired configurations may be employed.

BRIEF DESCRIPTION OF THE DRAWINGS

FIG. 1 shows a perspective view of a generalized system diagram of a modular broadcast/strip liquid spray system employing the present invention.

FIG. 2 shows a perspective view of the present strip conversion assembly.

FIG. 3, comprised of FIGS. 3a, 3b and 3c, shows a typical control arrangement and various alternative arrangements.

DESCRIPTION OF THE PREFERRED EMBODIMENT

Figure 1:
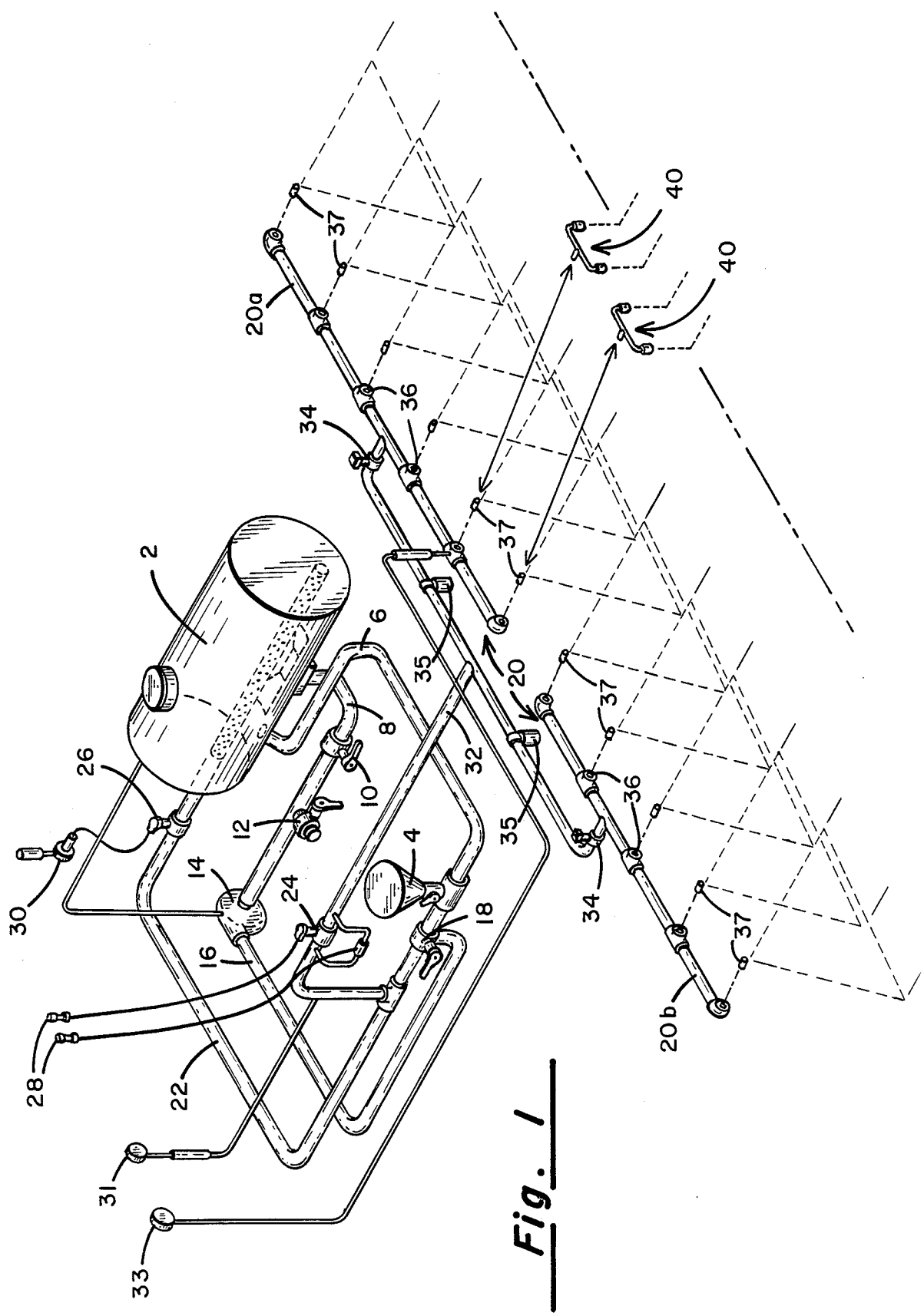

Referring to FIG. 1, a system diagram, is shown of a convertible braodcast/strip spray system including the present invention. Such a system typically comprises a liquid storage tank 2 that is loaded with desired liquid and dry treatment materials, an eductor assembly 4 and a supply line 6. The liquid treatment materials (i.e. fertilizers, insecticides, herbicides, etc.) are then applied via a pressurized system of conduits, valves and a pump to a primary manifold assembly and whereupon a plurality of spaced apart nozzles are mounted so as to cause the liquid matter to be broadcast applied to the row crops.

In particular, the liquid is distributed to a high pressure pump 14 via the gravity feeding thereof from the tank 2 to a suction line 8, a normally open shut-off valve 10 and a normally closed reload valve 12. The liquid material is then pumped via the pump 14 and a high pressure conduit 16 to a diverter junction near the normally closed load valve 18. At the diverter junction, the liquid material is able to flow in either of two conduits, that is, to the primary manifold 20 or to the sparger conduit 22.

The particular amount of material that flows to each of the conduits is controlled via a flow and pressure regulating primary manifold supply valve 24 and a flow regulating sparger valve 26 that are respectively placed therealong. Depending upon the pressure on the liquid material as it passes through the conduits at these valves, and which pressure is operator monitored, the operator may open and close the valves 24 and 26 in desired amounts to vary the pressure and amount of material passing therethrough. Such pressure regulation is achieved via the vernier pressure throttling controls 28 and a lever controlled sparger valve 30. Typically though, the sparger valve 26, is relatively coarsely adjusted so as to be partially open, whereas the primary manifold supply valve 24 is monitored via a pump pressure gauge 31 and a nozzle pressure gauge 33 and regulated via the throttling controls 28 so as to control the pressure of the liquid in the primary manifold 20.

Referring to the liquid paths, a portion of the high pressure liquid at the diverter junction, is returned to the tank 2, via the sparger conduit 22 and the sparger control valve 26, which reduces the pressure prior to the liquid entering the storage tank 2. At the tank 2, the liquid is then returned via a plurality of openings formed within the sparger conduit 22 and which openings produce a continual agitation of the liquid in the tank 2, and whereby a uniform suspension is maintained.

The remaining liquid is diverted via the primary control valve 24 at the desired operating pressure to a bifurcated primary manifold supply line 32 that, in turn, supplies the various halves 20a and 20b of the primary manifold or spray boom 20 through filter 35 and remotely controlled shut-off valves 34. The shut-off valves 34 are placed intermediate the halves of the primary manifold 20 and permit the operator to manually shut off one or the other of the halves 20a and 20b of the spray boom 20. It is to be recognized too that while the system of FIG. 1 contemplates a two section spray boom, either more sections or a single section spray boom may be employed.

The feature of note though is that such a spray boom 20 acts as a primary manifold to deliver the treatment material to a plurality of outlet ports 36 that are spaced apart from one another along the boom 20. Such ports 36 for a broadcast application system are typically designed to be compatible with a broadcast nozzle 37 so as to cause the distribution of the liquid in an overlapping spray pattern and ensure 100% coverage of the area sprayed with an approximate uniformity of distribution from end to end of the boom 20. The spacing between such nozzles for a broadcast application system, being typically on the order of 60 inches. Alternatively, for a strip application system, the outlet ports 36 are spaced closer together and the associated nozzles are designed so as to eject the liquid in streams, rather than in a spray.

While individual broadcast and strip application systems have previously been employed, the present invention contemplates a modular system that in a simplistic fashion permits the conversion of the higher pressure broadcast spray system to a low pressure strip application system. Such a conversion assembly is illustrated in FIG. 1 via the alternative strip nozzle assemblies 40 that are shown relative to the various outlet ports 36. The assemblies 40 eject narrow streams of liquid and which streams are typically directed in a relative spacial orientation to the row crops (i.e. a specific distance to the right or left thereof or immediately thereover). The strip assemblies 40, also, like the broadcast nozzles 37, are detachably mounted to the outlet ports 36 via self-aligning couplers (not shown) containing various mating keys, slots and cam-locks. The self-aligning couplers, however, are the subject of my co-pending application entitled "Self-Aligning Coupler for Fluid Transmitting Conduits" Ser. No. 411,633, filed Aug. 26, 1982, now abandoned, and for more information, attention is directed thereto. It is also to be noted that the present strip application assembly is adaptable to the modularly engineered equipment of the present assignee, for example the Ag-Chem TERRA-GATOR®1603 field applicator.

Figure 2:
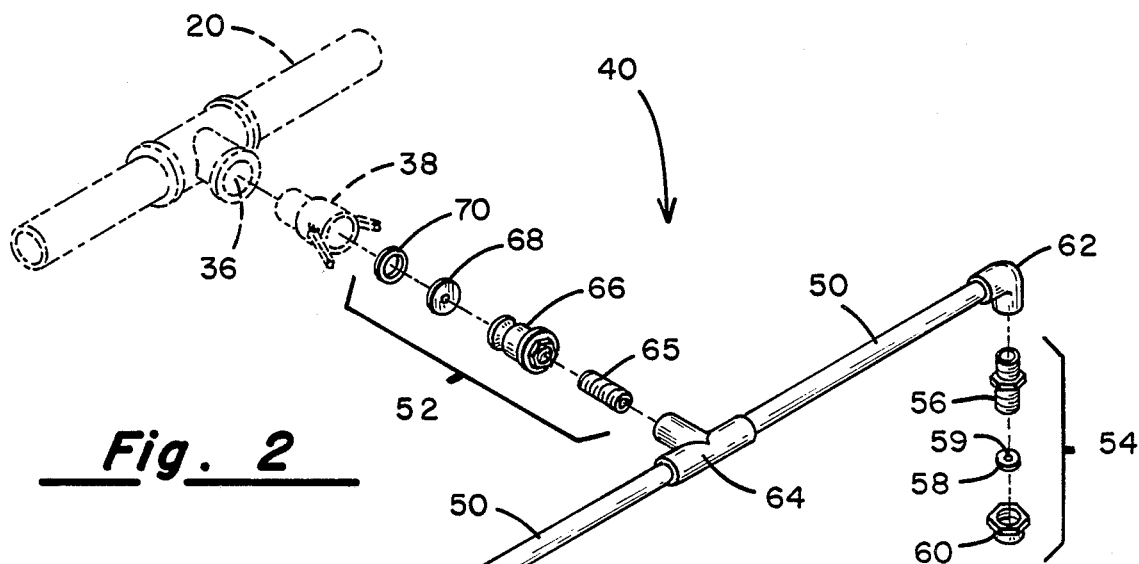

Referring now to FIG. 2, a detailed perspective view is shown of an individual strip application assembly 40. In particular, each assembly is comprised of a secondary manifold 50 and which in a 1×2 configuration contains a secondary supply metering orifice assembly 52 and two strip nozzles 54. Thus, the liquid is supplied from an outlet port 36 to the secondary orifice assembly 52, to the manifold 50 and thence to the individual strip nozzles 54. It is to be recognized though that depending upon the system, any number of strip nozzles may be coupled to the strip manifold 50, but for most applications and a typical 60 inch broadcast distribution system, either a 1×2 or a 1×3 configuration is sufficient and will accommodate 30 and 20 inch spacings.

From FIG. 2, it is to be noted that each strip nozzle 54 is individually comprised of a threaded body 56, a sharp edged orifice 58 and a cap 60. The body 56 is typically formed from non-corrosive stainless steel or nylon and is comprised of two threaded segments (e.g. ⅜ inch NPT) which are threadably contained within an appropriate female, elbow fitting 62 on the manifold 50. The orifice 58, in turn, is typically fabricated from stainless steel as a flat washer with a thickness in the range from 0.050 to 0.070 inches and a precision aperture 59 on the order of 0.200 or 0.250 inches in diameter. While various shapes or sizes of apertures may be formed, for the present embodiment a circular straight walled apparatus 59 is preferred and which produces the desired outlet flow stream and insensitivity to viscosity changes. Furthermore, an aperture of 0.20 inches has been emperically determined to be most compatible with the spray system's 10 to 60 psi pressure range, required flow rate, and resistance to clogging by suspension fertilizers. Finally the cap 60 comprises a female threaded, nylon fitting which has an opening formed in the outlet end so as to circumscribe the aperture 59 of the orifice 58. It should be noted too that typically the strip manifold 50, elbows 62 and "T" fittings 64 are manufactured from a PVC material in that such a material is extremely rugged, light and non-corrosive in fertilizer mixes.

The primary orifice assembly 52 on the other hand is substantially the same as the strip nozzle assembly 54, although its body is formed so as to contain the requisite keys and shoulders so as to facilitate its detachable coupling with the couplers 38 at the outlet ports 36. The body 66 thereof is, in turn, coupled to the T fittings 64 by a threaded nipple 68 and intermediate the coupler 38 and body 66 is a secondary orifice 68 and gasket 70. The secondary supply or metering orifice 68 in the preferred embodiment is interchangeable with outlet orifice 58, except it may be size matched with a different aperture dimension. It should be recognized though that while in the present system configuration a sharp edged orifice is desired, in various other configurations, various other aperture shapes and/or tapered edges or edges of complex shapes may be preferred, especially where such shapes produce the desired flow and back-pressures when used with non-viscous fluids.

Before continuing, it should be noted too that while the nozzles of the strip assemblies 40 of FIGS. 1 and 2 are shown generally in 90° configurations, various other angulated configurations or fitting placements along the strip manifold 50 may be desired depending upon the configuration of the equipment and spray boom 20. In particular, it may be desired to offset the strip manifold 50 from the boom 20 at a different angle and which can be achieved via various angulated couplers (i.e. 30°, 45° etc.). Alternatively, the placement of the T fitting and or strip nozzles 54 may be altered by cutting the lengths of manifold pipe as desired and/or using various other angulated fittings to accommodate the system configuration.

Referring again to FIG. 1, it should be noted that the present strip application system is essentially configured in a series/parallel fashion in that while each of the spaced apart outlet ports 36 on the spray boom 20 are supplied from the tank 2, each of the strip nozzles 54 are supplied in parallel from the series coupled primary nozzle 52 at each individual outlet 36. Such an arrangement is of particular merit for modular systems of the present type in that this configuration in combination with the straight edged orifices 58 and 68 produces a sufficient back-pressure so as to accommodate the pressure range of the spray system. Also, as mentioned at the low end of the pressure range, it is of particular importance to maintain a constant pressure, since any variations at the low end of the range result in greater disparities in flow rate than at the higher end of the pressure range. Thus, it is necessary when reconfiguring a broadcast system to a strip system that a sufficient amount of back-pressure (within the range of the primary supply valve 24) be maintained at the strip nozzles.

It is also to be recognized that, whereas here, it is desired to use an orifice or metering disc 58 with as large an aperture 59 as possible as as to make the system insensitive to clogging from intentionally suspended solids in the mixture, it becomes very difficult to maintain a sufficiently large back-pressure. Further, where it is desired, as here, to obtain a flow rate range on the order of 10:1 (e.g. 100 to 10 gallons per acre) within a low and relatively narrow pressure range (i.e. 10 psi to 60 psi), this end becomes even more difficult. Attention is therefore directed to FIG. 3, wherein FIG. 3a shows a conventional broadcast system with orifices 58 only at the nozzles and where FIGS. 3b and 3c show alternative conversion systems.

Figure 3B:
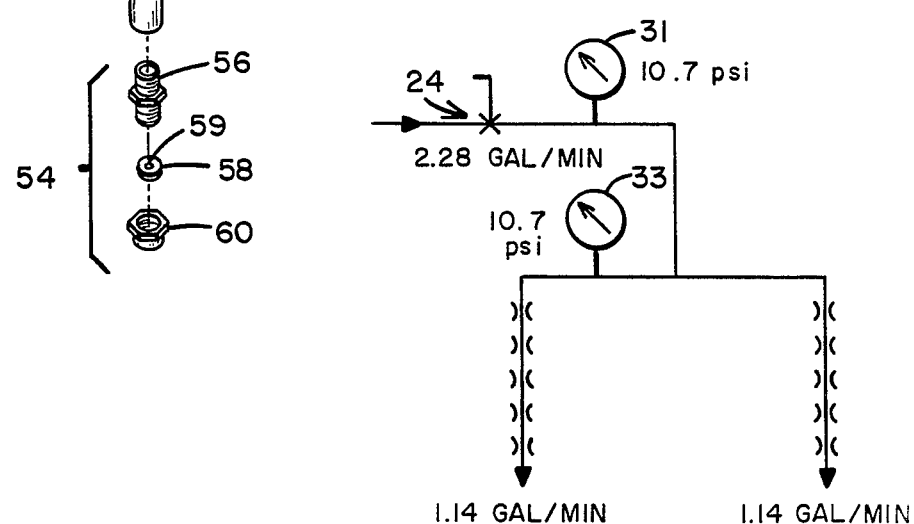
Figure 3A:
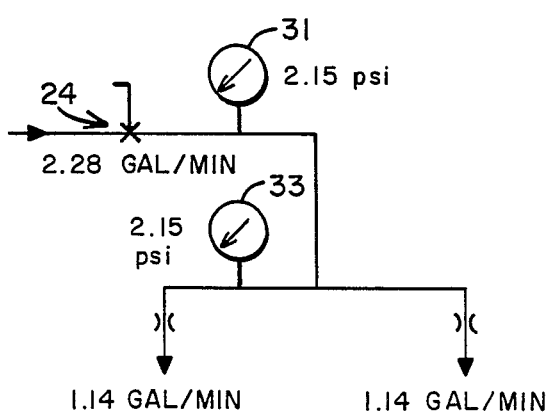
Figure 3C:
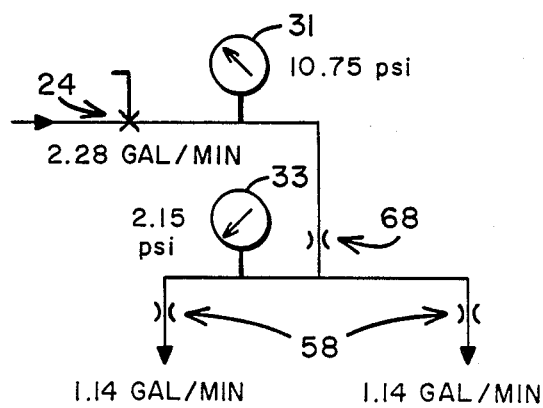

Hypothetically and referring to FIG. 3b, while the back-pressure of a converted system may be increased to each strip nozzle 54 on a boom 50 that contains a number of such nozzles 54 by inserting a number of orifices 58 in series with each strip nozzle 54 (since the back-pressure at each series orifice is additive), such an arrangement would require an excessive number of orifices per nozzle.

For example, assuming a spacing of 30 inches between row crops, the flow rate required for 15 gallon per acre distribution and a distribution speed of 15 miles per hour is:

$$Q = RVW/5940$$

where:
R = distribution per acre
V = velocity
W = spacing between crops
or for the present assumptions $$Q = \frac{(15).(15).(30)}{5940} = 1.136 \text{ per minute.}$$

The pressure necessary to supply this flow rate at each nozzle, in turn, is:

$$P = S \left[ \frac{q}{29.81 \times Cd \times d^2} \right]^2$$

where:
S = 1.0 specific gravity
q = 1.136 gallons/minute Cd = 0.65 for sharp edged orifice
d = 0.20
or, $$P = (1) \left[ \frac{1.136}{29.81 \times .65 \times (.2)^2} \right]^2 = 2.15 \text{ psi}$$

Thus and as per the above assumptions, an aperture 59 of 0.20 inches in diameter produces a flow rate of 1.136 gallons per minute and requires a nozzle pressure of 2.15 psi. Consequently, for a broadcast system, such as here, operating in a pressure range from 10 to 60 psi, it would require five of such orifices per nozzle to achieve a controllable pressure (i.e. 5 orifices × 2.15 psi = 10.7 psi), and which clearly is not cost effective or practical.

However, by applying a basic hydraulic principle of flowthrough orifices (i.e. the pressure is proportional to the square of the flow) and using a secondary supply orifice 68 in the primary orifice assembly 52 in the fashion of FIGS. 2 and 3c it can be seen that the back-pressure induced by a secondry orifice 68 of a diameter of 0.20 inches is equal to 4×2.15 or 8.6 psi. This then when added to the parallel strip nozzle pressure of 2.15 psi results in the same back-pressure of 10.75 psi. Thus, the series/parallel system of FIG. 3c requires only three orifices per outlet port 36 to meet system pressure requirements and is therefore more desirable than the series system of FIG. 3b. It should be noted too that while a series/parallel combination of two or three strip nozzles per secondary supply nozzle 52 is preferrable for most applications, still other configurations can be employed. Further, it is to be recognized that the present organization permits the use of various flow shaping and secondary supply orifices 68 with each strip nozzle assembly so as to produce various other back pressures and stream shapes.

While the present invention has been described with respect to various particular embodiments thereof, it is to be recognized that still other equivalent structures may suggest themselves to one of skill in the art. It is therefore contemplated that the present invention should include all of such equivalents within the spirit and scope of the above described invention and the following claims.

What is claimed is:

1. Apparatus for converting a transportable broadcast spray application system, wherein liquid fertilizers or the like are pumped from a storage tank and supplied at a regulated pressure within the range of 10 to 60 psi to a plurality of spaced apart primary outlet ports attached along a primary delivery manifold, over to strip application, comprising, in combination:

a plurality of self-aligning couplers attachable to each of said outlet ports, each coupler comprising (1) a female body portion threadably attachable to one of said outlet ports and having a bore extending along a flow axis and at least one pivotal locking cam and (2) a male body portion detachably mountable in said bore in engagement with said locking cam and in fluid flow communication with said primary manifold, and each of said couplers including at least one replaceable sharp-edged primary metering disc having a flow determining orifice of a predetermined fixed size formed therethrough along said flow axis;

a plurality of secondary manifolds, each attached to one of said male body portions and "T" mountable to said primary manifold and each including at least two secondary outlet ports displaced therealong in parallel relation to said primary manifold, each of said secondary outlet ports including at least one sharp-edged replaceable secondary metering disc having a flow determining orifice of a predetermined fixed size formed therethrough along said flow axis; and wherein the aperture size of each of said primary and secondary metering discs for each secondary manifold is selected so that in combination the liquid fertilizer is strip applied at each secondary outlet port at a constant pressure regulated by said primary and secondary metering discs to be less than 10 psi.

2. Apparatus as set forth in claim 1 wherein the aperture of each of said secondary metering discs is selected to be within a range from 0.200 to 0.250 inches in diameter.

* * * * *